TRANSVERSAL FILTER

Filed Dec. 21, 1962 3 Sheets-Sheet 1

INVENTOR
R. A. KAENEL
BY [signature]
ATTORNEY

United States Patent Office 3,271,703
Patented Sept. 6, 1966

3,271,703
TRANSVERSAL FILTER

Reginald A. Kaenel, Bethesda, Md., assignor to Bell Telephone Laboratories, Incorporated, New York, N.Y., a corporation of New York Filed Dec. 21, 1962, Ser. No. 246,378
3 Claims. (Cl. 333—28)

This invention relates to transmission networks and more particularly to transversal filter circuitry.

The transversal filter, which proves advantageous in applications requiring an adjustable filter, is composed of a continuous delay line having taps at intervals along its length that are connected together to form the filter output. Signal multipliers situated between each tap and the filter output determine the transmission characteristics of the transversal filter. Each multiplier setting, i.e., the multiplication factor introduced by the multiplier, varies in the range between plus one and minus one and represents an independent variable affecting the filter transmission characteristics. Thus, the transversal filter is capable of adjustment over a large range of transmission characteristics.

In some cases, it is desirable to set the multipliers of a transversal filter under the control of electrical signals, each representing a different multiplier setting. For example, it has been proposed that equalization be employed to enlarge the effective channel capacity of conventional telephone transmission lines during periods in which they are used for transmitting high speed, digital or analog data, thus reducing the time any telephone line is occupied to transmit the data. One practical arrangement would be to make available a pool of transversal filters to a group of transmission lines and use any filter with any transmission line as the telephone traffic situation changes. This requires that an equalizer be adjusted each time it is called into use to equalize a transmission line. Transversal filters are attractive as equalizers in this application because they can compensate for the wide range of different transmission characteristics that may be encountered in a large group of telephone lines. To avoid time-consuming manual adjustments that would unduly tie up the telephone line and thus offset much of the advantage realized from higher speed data transmission, the transversal filter multipliers may advantageously be set under the control of electrical signals. For example, information representing the multiplier settings required to equalize each telephone line could be stored in a memory device and made available as electrical control signals to be used for making appropriate equalizer settings when the particular telephone line is called upon to transmit high speed data. Alternatively, an analog computer having its results represented electrically could be employed to compute the multiplier settings from the impulse response of the telephone line each time it is to be equalized.

Conventionally, adjustable transversal filter multipliers take the form of potentiometers and the multiplication factors are changed by physical movement of slider arms. To set such a multiplier electrically, an electrical-to-mechanical transducer such as a motor must be employed. This introduces added expense, bulk, and unreliability into the equalizer equipment.

It is therefore the object of the present invention to provide simple transversal filter multiplier circuitry that is controlled completely by electrical apparatus.

In accordance with the above object, transversal filter multipliers take the form of sampling switches operating at a repetition rate satisfying the Nyquist sampling theorem. The proportion of each operating cycle in which a switch is in its conducting or sampling state determines the multiplication factor that it introduces. The switch's performance is controllable entirely by electronic techniques responsive to an electrical signal representing the desired multiplier setting.

A saturable, high remanence ferromagnetic core having a square loop magnetization curve stores residual magnetic flux, dictating the fraction of each cycle in which a switch is in its sampling state. Control circuitry is provided to fix the residual core flux precisely to produce the multiplication factor called for by an electrical signal representative of a multiplier setting.

According to a feature of the invention, a single bistate switch can be arranged to yield both positive and negative multiplication factors. In one state, the switch passes the signal tapped from the delay line inverted in phase by 180 degrees and in the other state the switch passes the signal tapped from the delay line directly, i.e., uninverted in phase.

The above and other features of the invention will become more apparent from consideration of the following detailed description taken in conjunction with the drawings in which.

Figures 1, 2:
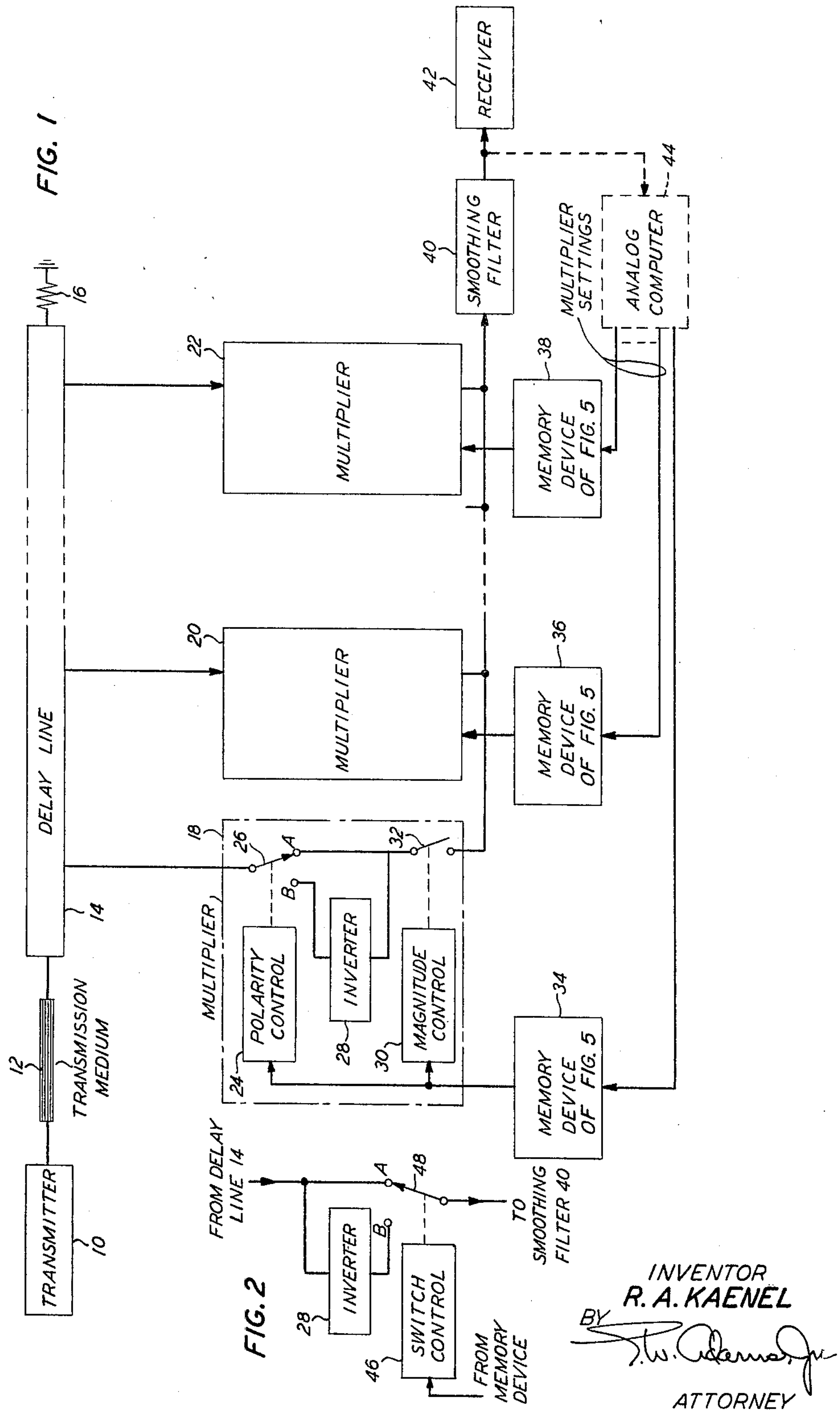
FIG. 1 is a schematic diagram partially in block form of a transversal filter, employing multiplier circuitry arranged according to the invention, shown in the environment of a transmission system for which equalization is to be provided.
FIG. 2 is a schematic diagram partially in block form of an alternative arrangement of the multipliers shown in FIG. 1.

FIG. 1 shows a transversal filter inserted in a transmission system for the purpose of equalization of the system. A transmitter 10 is connected to the input of a transmission medium 12. The input to the transversal filter, one end of a delay line 14, is connected to the output of transmission medium 12. Delay line 14 is terminated in its characteristic impedance by a resistor 16. Taps, some of which are shown in FIG. 1, are made at intervals of transmission delay along delay line 14 smaller than the reciprocal of twice the highest frequency component accommodated by the system. The taps are coupled to multipliers, represented by blocks labeled 18, 20, and 22. Each of these multipliers multiplies the signals from the associated tap on delay line 14 by some factor, normally different from the factor of each other multiplier, in the range between minus one and plus one, depending upon the transmission characteristics which the transversal filter is to exhibit. The outputs of all the multipliers such as 18, 20, and 22 are combined and, in preparation for utilization by a receiver 42, to a smoothing filter 40 that cuts off immediately above the highest frequency component accommodated by the system to attenuate the spurious frequency components introduced by the multipliers. Memory devices, represented by blocks labeled 34, 36, and 38, each store information indicative of the multiplication factor of a corresponding multiplier 18, 20, and 22, respectively.

The transversal filter, to the extent explained thus far, is well known in the transmission circuit art. The invention is directed towards novel multiplier circuitry and supporting control circuitry that are responsive to electrical signals representing the multiplier settings, i.e., the multiplication factors to be introduced. An analog computer 44 is shown in dashed outlines as one possible source of multiplier setting signals. Another possible source of multiplier settings would be a permanent storage device maintaining the multiplier settings that result in equalization of transmission medium 12 as well as similar multiplier settings that equalize other transmission mediums. The nature of the source of the multiplier setting signals is not relevant to the description of the invention.

Figure 3A:
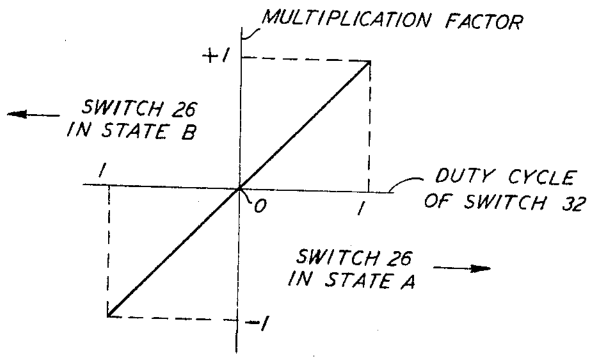
FIGS. 3A and 3B are graphs displaying the characteristics of the multipliers shown in FIGS. 1 and 2, respectively.

Inside of block 18 multiplier circuitry performing the multiplication function according to the invention is shown. A signal tapped from delay line 14 is applied to the arm of a switch 26. When switch 26 is in state A, the tapped signal is applied directly to a sampling switch 32. When switch 26 is in state B, the tapped signal passes through an inverter 28 and is presented to switch 32 shifted in phase by 180 degrees. Polarity control circuitry 24 oversees the operation of switch 26 responsive to the polarity of a multiplier setting signal shown emanating from memory device 34. Sampling switch 32 is operated by magnitude control circuitry 30, responsive to the magnitude of the multiplication factor stored in memory device 34, at a rate at least as great as twice the highest frequency component which the system accommodates, thus satisfying the Nyquist sampling theorem. The proportion of each cycle during which switch 32 is closed, hereafter called the duty cycle of switch 32, determines the magnitude of the multiplication factor introduced. The characteristics of this multiplier are illustrated by the graph in FIG. 3A. For example, it can be seen that to produce a multiplication factor of plus one, the duty cycle of switch 32 is one and switch 26 is in state A. On the other hand, for a multiplication factor of zero, the duty cycle of switch 32 is zero and the state of switch 26 is immaterial.

Figure 3B:
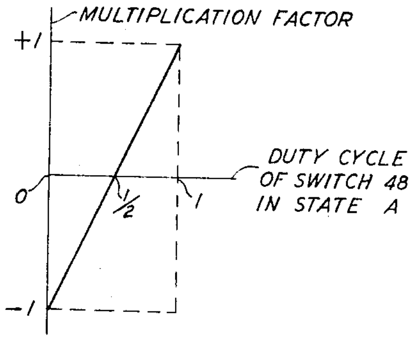

FIG. 2 discloses an alternative multiplier arrangement that can be substituted for the multiplier of FIG. 1. This configuration requires only one switch 48 whose performance determines both the magnitude and phase of the multiplication factor, operating at a rate that satisfies the Nyquist sampling theorem. When switch 48 is in state A, the signal tapped from delay line 14 is passed without phase inversion to the multiplier output and, when switch 48 is in state B, the tapped signal is applied through inverter 28 to the multiplier output 180 degrees out of phase with the signal applied to the multiplier output when switch 48 is in state A. The duty cycle of switch 48 will be taken as the proportion of each cycle in which it is in state A. As a result, the net signal appearing at the output of the multiplier is the tapped signal multiplied by a factor equal to the difference between the time spent per unit time by switch 48 in each of its two states. Switch control circuitry 46 oversees the operation of switch 48 responsive to an associated memory device, as shown in FIG. 1. FIG. 3B depicts the characteristics of the multiplier of FIG. 2. It can be seen from FIG. 3B that the multiplication factor varies linearly from minus one when the duty cycle of switch 48 is zero to plus one when the duty cycle of switch 48 is one. At a duty cycle of one half the multiplication factor is zero.

Figure 4:
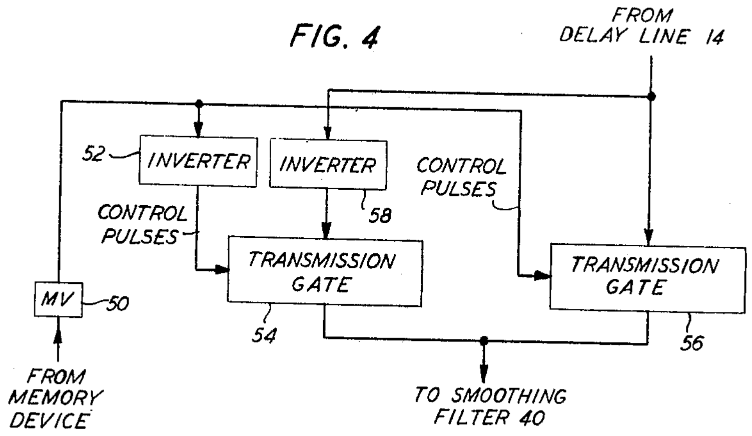
FIG. 4 is a schematic diagram in block form of a multiplier similar to that of FIG. 2 composed of transmission gates.

Switches 26, 32, and 48 may be implemented by simple relays. In this case, the control circuitry shown in each of blocks 24, 30, and 46 could simply be a relay coil coupled mechanically to the movable switch arm. However, due to the rapid speed of operation demanded of switches 32 and 48 to satisfy the Nyquist sampying theorem, electronic transmission gates such as shown in the text book Pulse and Digital Circuits by Millman and Taub, McGraw-Hill Book Company, Inc., 1956, FIG. 14–10B, at page 436, might prove more suitable switching devices. FIG. 4 illustrates the multiplier of FIG. 2 implemented with such transmission gates. The duty cycle of a bistable multivibrator 50, whose frequency of operation satisfies the sampling theorem, is controlled, in a manner to be described below, by a memory device associated with the multiplier. Multivibrator 50 alternately drives identical transmission gates 54 and 56 into conduction. For this purpose, the output of multivibrator 50 is applied directly to the control terminal of gate 56 and via an inverter 52 to the control terminal of gate 54. When multivibrator 50 is in one state, transmission gate 56 is enabled, thus passing the signal tapped from delay line 14 uninverted in phase to smoothing filter 40. When multivibrator 50 is in the other state, the output from inverter 52 is in the first state, thus enabling transmission gate 54 and the signal from delay line 14 passes through inverter 58 and gate 54 to smoothing filter 40.

Figure 5:
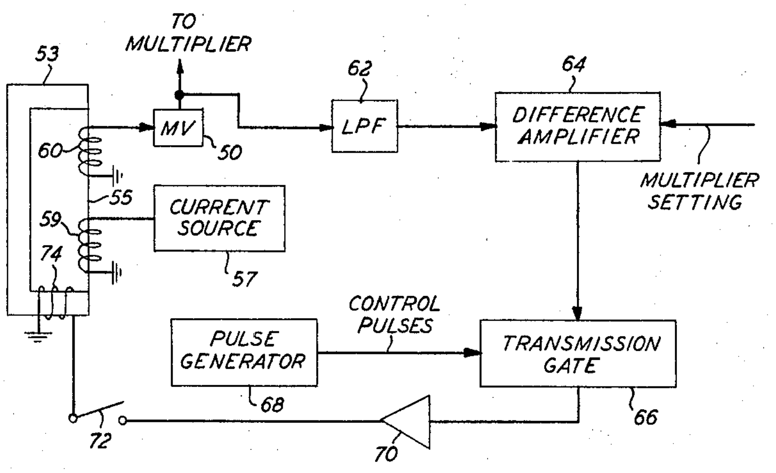
FIG. 5 is a schematic diagram partially in block form showing information storage circuitry including a ferromagnetic core that controls the settings of the multipliers of FIG. 2.

FIG. 5 discloses a memory device, such as designated by blocks 34, 36, and 38, that stores the multiplication factor to be introduced by an associated multiplier. A saturable, high remanence ferromagnetic core element 53, i.e., one with a square loop magnetization curve, having an air gap breaking its continuity, constitutes the main portion of the memory device. The multiplication factor is represented by the residual magnetic flux density existing in core 53. A saturable ferromagnetic strip 55, disposed to intercept some of the flux flowing in the gap of core 43, is employed to "read-out" the information representing the multiplication factor stored in core 53. This is accomplished by applying the output of a sinusoidal current source 57, whose frequency equals the rate at which the sampling switch is to operate, to a coil 59 wound around strip 55. Because strip 55 is much smaller in cross section than core 53, the flux generated in strip 55 by the current in coil 59 does not permanently affect the flux density in core 53. The total flux existing in strip 55 is the sum of the portion of residual flux in core 53 flowing through strip 55 and the flux resulting from the current flowing through coil 59. This is represented graphically in FIG. 6. The top graph represents the magnetization curve i.e., plot of magnetic flux density B against magnetic field intensity H, and the bottom graph represents the magnetic field intensity existing in strip 55 as a function of time. Parallel dashed lines 78 and 79 are projections onto the bottom graph of the magnetic field intensity at which strip 55 undergoes changes in state, i.e., change of direction of flux density.

Figure 6:
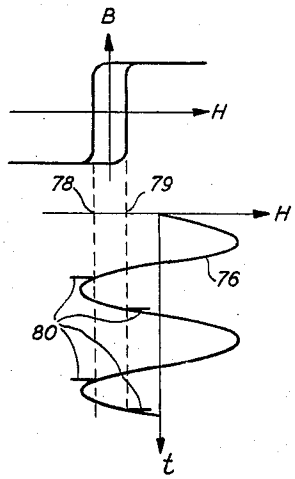
FIG. 6 is a graph depicting the mode of interrogation of the ferromagnetic core shown in FIG. 5.

As the output from current source 57 varies, the magnetic field intensity in strip 55, represented in FIG. 6 by curve 76, also varies proportionally thereto. When the magnetic field (curve 76), moving away from the $t$ axis, crosses line 78 strip 55 changes state by reversal of the direction of flux density, and when the magnetic field (curve 76), moving toward the $t$ axis, crosses line 79 strip returns to the original state by again reversing the direction of flux density. The sudden changes in flux in strip 55 occurring when curve 76 crosses lines 78 and 79 cause the generation of voltage pulses in a read-out coil 60 wound around strip 55. These voltage pulses are depicted in FIG. 6 by spikes 80. The duration between spikes 80 is dependent upon the displacement of lines 78 and 79 from the $t$ axis. Consequently, the position of the voltage pulses generated across coil 60 is indicative of the residual flux stored in core 53. Multivibrator 50 is then synchronized to the pulses emanating from coil 60, thus making its duty cycled dependent upon the residual flux existing in core 53.

In order to set the flux precisely in core 53 to lend the proper duty cycle to multivibrator 50 responsive to an electrical signal, whose magnitude is representative of the multiplier setting, resort is had to a feedback control loop. Accordingly, the output from multivibrator 50 is applied to a low-pass filter 62 designed to pass only the direct-current component thereof. This direct-current component is comparable to the multiplication factor actually introduced by the multiplier. The output of filter 62 is compared in a difference amplifier 64 with the multiplier setting signal. The resulting difference of error signal is applied to a transmission gate 66, which can be identical in construction to gates 54 and 56. A pulse generator 68 supplies control pulses, preferably occurring at a frequency substantially lower than the frequency of source 57, to transmission gate 66. The resulting output from transmission gate 66 is a train of pulses whose amplitude is representative of the discrepancy between the multiplier setting signal and the output from low-pass filter 62 (representative of the residual flux stored in core 53). The output from gate 66 is amplified in an amplifier 70 and applied through a switch 72, closed during the core setting operation, to a coil 74 wound around core 53. The output of amplifier 70 drives a pulsating current through coil 74 that changes the residual flux in core 53 to conform to the multiplication factor specified by the multiplier setting signal. During the core setting operation the pulses driving core 53 through coil 74 diminish in value as the residual flux in core 53 approaches a value that produces the multiplication factor called for by the multiplier setting signal. When the residual flux in core 53 is the desired value no current pulses are applied to coil 74 and a condition of equilibrium exists. After core 53 has been set as described, switch 72 is opened, disconnecting the core setting circuitry, and the transversal filter is in a ready state. If continual changes in the multiplication factor are desired during operation of the transversal filter, switch 72 is kept closed.

The pulse frequency of generator 68 is sufficiently low to permit transient effects in core 53 and strip 55, caused by the driving pulses applied to coil 74, to decay to an insignificant value between pulses. Thus, each time a pulse from generator 68 samples the output of difference amplified 64 in transmission gate 66, the flux in core 53 is essentially residual flux and the instantaneous output of difference amplified 64 is reasonably representative of steady state conditions in core 53.

If the multiplier of FIG. 2 is employed, only one multiplier setting signal per multiplier is required to control both the magnitude and polarity of the multiplication factor. The polarity of the single multiplier setting signal determines the direction of residual flux in core 53 of FIG. 5, which in turn determines the polarity of the multiplication factor introduced by switch 48 in FIG. 2. The magnitude of the single multiplier setting signal is directly proportional to the multiplication factor to be introduced by switch 48. The proportionality constant depends upon the characteristics of the output of multivibrator 50. For example, if the output of multivibrator 50 in its two states is +10 volts and −10 volts respectively, for a multiplication factor of plus one the multiplier setting would be +10 volts, for a multiplication factor of zero the multiplier setting would be zero volts, and for a multiplication factor of minus one the multiplier setting would be −10 volts.

If the multiplier of FIG. 1 is used two multiplier setting signals per multiplier are required. The one is a binary signal that controls the polarity of the multiplication factor introduced by the multiplier of FIG. 1. This signal is applied to polarity control circuitry 24, e.g. a relay coil, to control the state of switch 26. The other is a signal directly proportional to the magnitude of the multiplication factor and depending upon the characteristics of the output of multivibrator 50. For example, if the output of multivibrator 50 changes between +10 volts and −10 volts, as in the above example, the multiplier magnitude setting signal would be +10 volts for multiplication factor of 1 and −10 volts for a multiplication factor of zero.

A co-pending patent application of mine (Serial No. 281,999, filed May 21, 1963) discloses and claims core setting circuitry related to that of this application.

What is claimed is:

1. A transversal filter comprising a delay line terminated at one end in its characteristic impedance, taps situated along the length of said delay line, an input terminal attached to the other end of said delay line, a utilization circuit, and a signal multiplier corresponding to each of said taps, said signal multipliers each comprising an input circuit connected to its respective tap, an output circuit connected to said utilization circuit, switching means operable at a rate at leas as high as twice the highest frequency component to be trnasmitted through said filter for selecting the polarity, inverted or uninverted, of signal transfer between said input circuit and said output circuit, the duty cycle of said switching means determining the extent of signal transfer therethrough, a bistable signal source the output of which controls the duty cycle of said switch, a saturable high remanence ferromagnetic core the continuity of which is interrupted by a magnetic gap, a strip of saturable ferromagnetic material situated in said gap to intercept magnetic flux flowing in said core, said strip having a much smaller cross section than said core, a read-out coil adapted to produce voltage pulses signifying changes in state of flux density in said strip, said voltage pulses generated by said read-out coil being applied to control the duty cycle of said bistable device, a driving coil adapted to magnetize said strip, a periodic signal source coupled to said driving coil, and a control circuit for setting the flux existing in said core comprising a source of signals representative of a multiplier setting to be introduced, means for abstracting the direct-current component of said output of said bistable source, means for comparing said direct-current component signal with said multiplied setting signal, and means responsive to the difference between said last-named signals for adjusting the residual flux in said core until said last-named signals are in agreement.

2. A transversal filter comprising a delay line, an input terminal connected to said delay line, a signal source having an upper frequency component limit connected to said input terminal, taps situated along the length of said delay line, a utilization circuit, and a signal multiplier corresponding to each of said taps, for applying a factor between +1 and −1 in multiplying relation with the signal appearing at each tap, said signal multipliers each comprising an input circuit connected to its respective tap, an output circuit connected to said utilization circuit, switching means operable at a rate at least as high as twice said upper frequency component limit for selecting the polarity, inverted or uninverted, of signal transfer between said input circuit and said output circuit, the duty cycle of said switching means determining the multiplying factor and hence extent of signal transfer therethrough, a bistable signal source the output of which controls the duty cycle of said switching means, a high remanence magnetic core the continuity of which is interrupted by an air gap, a strip of saturable magnetic material of much smaller cross section than said core situated to intercept magnetic flux flowing in said core, a read-out coil adapted to produce voltage pulses signifying changes in state of flux density in said strip, said voltage pulses generated by said read-out coil being applied to synchronize said bistable device, a driving coil adapted to magnetize said strip, and a periodic signal source connected to said driving coil, whereby the duration between successive ones of said pulses is a measure of the flux in said core.

3. Signal multiplier circuitry comprising an input circuit, a signal source having an upper frequency component limit connected to said input circuit, an output circuit, switching means operable at a rate at least as great as twice said upper frequency component limit for selecting the polarity, inverted, or uninverted, of signal transfer between said input circuit and said output circuit, the duty cycle of said switching means determining the extent of signal transfer therethrough, a bistable signal source the output of which controls the duty cycle of said switch, a saturable high remanence magnetic core the continuity of which is interrupted by a magnetic gap, a strip of saturable magnetic material situated in said gap to intercept magnetic flux flowing in said core, a read-out coil adapted to produce voltage pulses signifying changes in state of flux density in said strip, said voltage pulses generated by said read-out coil being applied to control the duty cycle of said bistable device, a driving coil adapted to magnetize said strip, a periodic signal source applied to said driving coil, and a control circuit for setting the flux existing in said core comprising a source of signals representative of a multiplier setting to be introduced, means for abstracting the direct-current component of said output of said bistable source, means for comparing said direct-current component signal with said multiplier setting signal, and means responsive to the difference between said last-named signals for adjusting the residual flux in said core to reduce the discrepancy therebetween.

References Cited by the Examiner

UNITED STATES PATENTS

| | | | |
|---|---|---|---|
| 2,418,128 | 4/1947 | Labin et al. | 333—70 |
| 2,801,351 | 7/1957 | Calvert | 307—149 |
| 2,855,573 | 10/1958 | Fredevall | 333—70 |
| 2,897,352 | 7/1959 | Smith-Vaniz | 334—12 |
| 2,908,873 | 10/1959 | Bogert | 333—18 |
| 2,908,874 | 10/1959 | Pierce | 333—18 |
| 2,912,601 | 11/1959 | Slatten | 333—70 |
| 3,001,137 | 9/1961 | Kassel | 328—38 |
| 3,027,468 | 3/1962 | Hill | 307—88.5 |
| 3,071,739 | 1/1963 | Runyon | 333—18 |
| 3,105,197 | 9/1963 | Aiken | 328—154 |
| 3,111,645 | 11/1963 | Mulford | 340—146.3 |

HERMAN KARL SAALBACH, *Primary Examiner.*

C. BARAFF, *Assistant Examiner.*